Oct. 28, 1952            H. M. WAGNER            2,616,058
TRACING CHARACTERISTIC CURVE OF ELECTRONIC TUBES
Filed Sept. 12, 1950            3 Sheets-Sheet 1
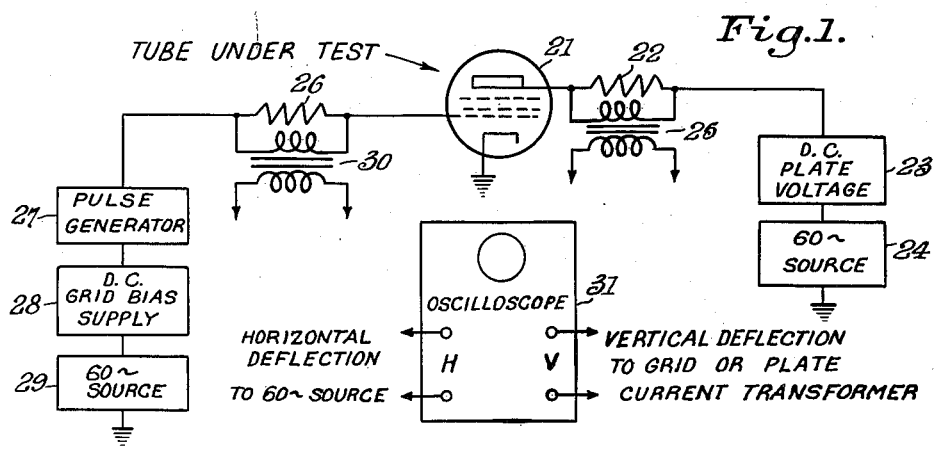
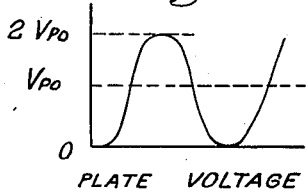
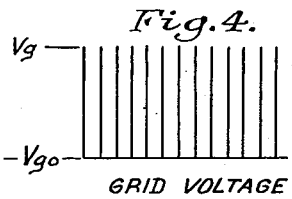
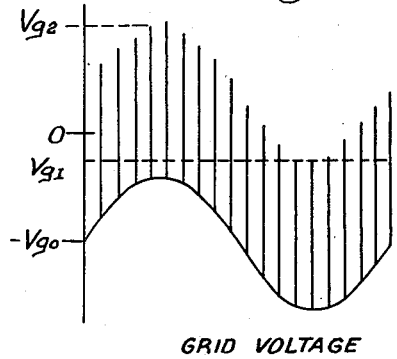
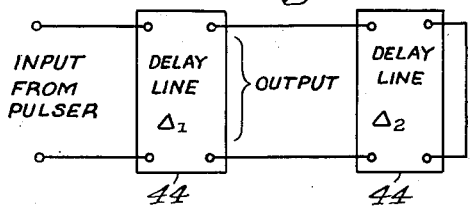
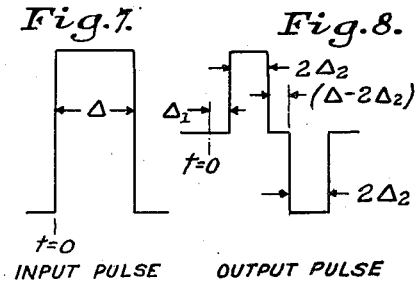
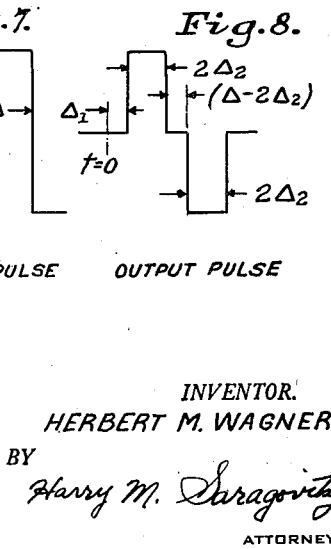
INVENTOR.
HERBERT M. WAGNER
BY
Harry M. Saragovitz
ATTORNEY

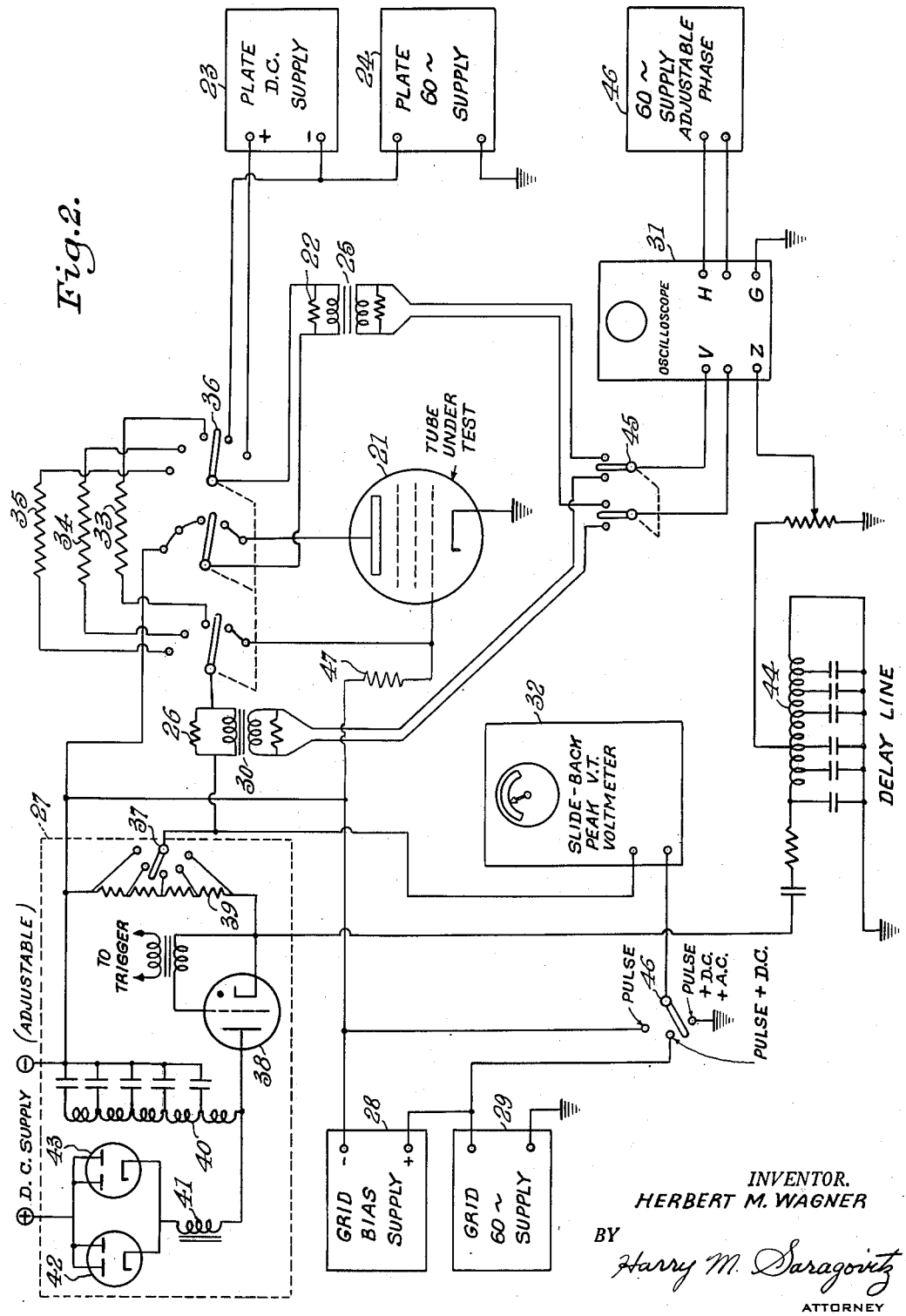

Oct. 28, 1952 H. M. WAGNER 2,616,058
TRACING CHARACTERISTIC CURVE OF ELECTRONIC TUBES
Filed Sept. 12, 1950 3 Sheets-Sheet 3

PULSE GENERATOR OUTPUT

OSCILLOSCOPE GATE $E_p - I_p$ $E_p - I_g$ $E_g - I_p$ $E_g - I_g$

INVENTOR.
HERBERT M. WAGNER
BY
Harry M. Saragovitz
ATTORNEY

Patented Oct. 28, 1952

2,616,058

UNITED STATES PATENT OFFICE 2,616,058

TRACING CHARACTERISTIC CURVE OF ELECTRONIC TUBES

Herbert M. Wagner, Asbury Park, N. J.

Application September 12, 1950, Serial No. 184,509

42 Claims. (Cl. 313—371)

(Granted under the act of March 3, 1883, as amended April 30, 1928; 370 O. G. 757)

The invention described herein may be manufactured and used by or for the Government for governmental purposes, without the payment of any royalty thereon.

My invention relates to an apparatus and method for displaying the characteristic curves of an electronic tube. The invention is especially useful for displaying curves at high peak power levels in the positive grid region.

The measurement of a tube characteristic involves the measurement of a variable potential on one electrode and the corresponding current to either the same or to another electrode while all potentials except the one being varied are set at known fixed values. Characteristics may be measured a point at a time or by automatic methods which trace the complete curve. In the point by point method, the variable potential is set at a series of closely spaced values covering the range of interest. Voltage and current readings are taken at these points and the data plotted as a curve. In the automatic method, the entire curve is obtained rapidly without the need for plotting individual points. The curve is usually displayed on a cathode ray tube by applying a voltage across the horizontal deflection plates which is proportional to electrode voltage and a voltage across the vertical plates which is proportional to electrode current. Comparatively few problems are encountered in taking characteristics at power levels within the continuous duty rating of the tube. It is in the region of high peak power levels that the chief difficulties arise.

Although the determination of characteristics at high power levels involves basically the measurement of the same quantities as for low power levels, the test instrument must be capable of applying extremely high power to the tube during a time interval which is short enough to prevent damage to the tube or change in its characteristics. Systems have been devised in which the peak power is obtained by means of condenser discharges across the tube electrodes. In one such system the peak values of voltage and current are read on an oscilloscope. By charging the condenser successively to different voltages, data is obtained from which curves can be plotted. In another such system, the values of voltage and current as functions of time are displayed on separate screens during the condenser discharge period and the result recorded on a multi-element recorder. From this data, various characteristic curves can be plotted. In another type of system the peak power is obtained from power line transformers. The grid is connected to its supply periodically through a thyratron switch and the resulting currents are displayed on an oscilloscope. One point on the curve is thus obtained for each setting of the apparatus. Another method of obtaining the peak power is by means of rectangular shaped microsecond pulses. Maximum values of current are read by means of peak meters. From the data so obtained, curves can be plotted.

All of the above systems have the common disadvantage that the desired curves are not obtained at once automatically. In each case data is obtained from which the curves can be plotted. Some of these systems have a further disadvantage. It should be noted that an increase in grid voltage sometimes results in a decrease in plate current. Merely observing the height reached by an oscilloscope spot or a peak meter upon application of a charged condenser to the grid of the tube will lead to an erroneous plate current reading if the plate current is higher at an intermediate condenser voltage than at the initial peak condenser voltage.

Accordingly, it is an object of my invention to provide a method and apparatus for obtaining characteristic curves of an electronic tube automatically in both the low power and high power regions.

A further object is to provide such a method and apparatus which shall overcome the above mentioned disadvantages of previously known methods.

A more specific object is to provide a method and apparatus for displaying directly on an oscilloscope the characteristic curves of an electronic tube in the high positive grid region without the necessity for plotting the curves point by point.

In accordance with my invention, any desired characteristic curve may be displayed on an oscilloscope. The voltage on one electrode is selected as the abscissa. This electrode is supplied with an alternating voltage alone or with alternating and direct voltages in series. The magnitude of each of these voltages is selected so that the total voltage on the electrode will vary, during each cycle of the alternating voltage, over the range of values for which the characteristic is to be displayed. The alternating voltage may conveniently be taken directly from the usual 60 cycle power line. This alternating voltage is also connected to the horizontal deflection system of the oscilloscope. To prevent damage to the tube, the same or another electrode is biased by a direct voltage so as to cut off the tube for all voltages within the selected range. This biasing voltage is overcome periodically by a substantially rectangular pulse. The pulse width and repetition frequency are preferably selected to provide a small duty ratio. The frequency should preferably by many times the frequency of the alternating voltage and non-synchronous therewith. The current of either the same or another electrode may be selected for the ordinate of the curve and a voltage proportional thereto is applied to the vertical deflection system of the oscilloscope. The oscilloscope is normally blanked out and is brightened only for the duration of each pulse or a substantial portion thereof. Thus the horizontal deflection system receives a voltage proportional to the electrode voltage selected as the abscissa, while the vertical deflection system receives a voltage proportional to the desired ordinate. Since the oscilloscope is blanked out during the interval between pulses, the trace will consist of a series of dots. By suitable selection of pulse width and pulse repetition frequency, the entire curve is rapidly traced.

For a more complete understanding of my invention reference may be had to the accompanying drawings.

Fig. 1 is a simplified diagram of the invention.

Fig. 2 is a more complete diagram and includes many details omitted from Fig. 1.

Fig. 3 is a diagram of the plate voltage while displaying the plate current versus plate voltage curve.

Fig. 4 is a diagram of the grid voltage while displaying the plate current versus plate voltage curve.

Fig. 5 is a diagram of the grid voltage while displaying the grid current versus grid voltage or the plate current versus grid voltage curve.

Figs. 6, 7 and 8 are diagrams explanatory of the means for obtaining the oscilloscope intensifier gate.

Fig. 9 is a curve representing the output of the pulse generator.

Fig. 10 is a curve representing the oscilloscope intensifier gate.

Figs. 11–14 represent families of characteristic curves of a type 6C4 miniature tube obtained by means of the present invention.

Fig. 11 shows the plate current versus plate voltage curve;

Fig. 12 shows the grid current versus plate voltage curve;

Fig. 13 shows the plate current versus grid voltage curve;

Fig. 14 shows the grid current versus grid voltage curve.

Figure 9:
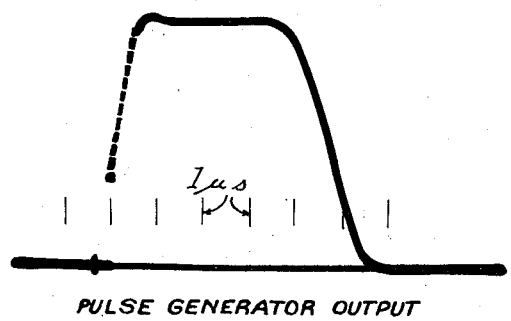
Figs. 9–14 are copied from photographs of oscilloscope traces.

Referring to Fig. 1, an electronic tube 21 whose characteristics are to be taken is shown connected in accordance with the invention. This tube may be a diode, a triode, or a multi-element tube as shown. The anode is connected through a resistor 22 to a source of direct current 23 and a source of alternating current 24. Across resistor 22 is connected a pulse type transformer 25 to obtain a voltage proportional to plate current. The grid is connected through a resistor 26 to a pulse generator 27, a source of D. C. bias 28, and an alternating current source 29 in series. Across resistor 26 is connected a pulse type transformer 30 to obtain a voltage proportional to grid current. The horizontal deflection system of an oscilloscope 31 is connected to a source of alternating current of the same frequency as the grid and plate sources. Alternating current sources 24 and 29 may conveniently be taken from the usual 60 cycle power supply mains. Plate voltage may be selected as the abscissa of the curve, in which case grid source 29 is not used. Similarly, if grid voltage is to be the abscissa, plate source 24 is not used. In either case, grid bias supply 28 is adjusted to cut off tube 21. Either grid current or plate current may be selected as the ordinate of the curve by connecting the appropriate transformer to the vertical deflection system of oscilloscope 31. The amplitude of the output of pulse generator 27 is adjusted so as to overcome the cut-off bias of supply 28 periodically. It follows that the horizontal deflection of oscilloscope 31 is always proportional to the selected abscissa, grid voltage or plate voltage. During each pulse, the vertical deflection is proportional to the selected ordinate, grid current or plate current. During each pulse an element of the desired curve is displayed as a dot. The entire curve is rapidly traced from these dots and appears on the screen as a continuous curve.

A more complete understanding of the invention may be had by reference to Fig. 2. Fig. 2 shows principally, in addition to the elements shown in Fig. 1, the circuit of the pulse generator 27, the oscilloscope intensifier gate, and the calibration circuit comprising a peak vacuum tube voltmeter 32, resistors 33, 34 and 35, and associated switches 36 and 37.

*Pulse generator*

The pulse generator, or pulser, is used to excite the grid of the tube under test with positive voltage pulses of adjustable amplitude. It is required that the pulser have a low output impedance in order that its voltage may be substantially independent of grid current and that the pulse shape, nominally rectangular, have an essentially flat top or plateau region for a considerable percentage of the pulse width.

The pulser shown in Fig. 2 employs a hydrogen thyratron 38 and is similar to types described and analyzed in "Pulse Generators" by Glascoe and Lebacqz, M. I. T., Radiation Laboratory Series, #5, McGraw-Hill Book Co., 1948. The thyratron pulser was chosen because of its simplicity and its low impedance capabilities. It is operated into a load resistor 39. The pulse forming network is an artificial line 40. The circuits for charging the network are conventional, and comprise an adjustable D. C. supply, a charging choke 41, and hold-off diodes 42 and 43. The main pulser is triggered at an adjustable repetition rate by an auxiliary pulser (not shown). Fig. 9 is a copy of an oscillogram of the output pulse of the pulse generator incorporated as a part of a complete curve tracer actually constructed. The oscillogram shows that the pulse height of this pulse generator remains almost constant for 2.5 microseconds.

*Oscilloscope intensifier gate*

The period during which the grid voltage pulse remains at a constant known level (2.5 microseconds for the apparatus actually constructed) is the interval during which significant measurement of electrode current is made. It is therefore desirable to eliminate from view those portions of the current pulses occurring during the unsteady pulse voltage outside this interval. This is accomplished by setting the intensity control of the oscilloscope for dim or zero brightness and applying pulses to the Z input in order to brighten the trace on the cathode ray tube during the top flat portion of the grid pulse. When this is done, bright well-defined dots can be made to appear and trace out the tube characteristic curve.

Figure 10:
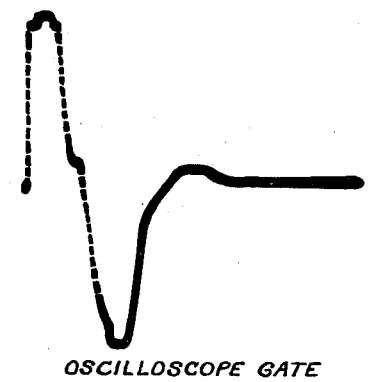

The principle of operation of the gate may be seen by reference to Figs. 6, 7 and 8. As shown in Fig. 6, voltage from the pulser is applied to a transmission line 44 (also shown in Fig. 2) which is shorted at the far end. The Z output is taken at a particular position along the line where the grid pulse appears, delayed by the desired amount $\Delta_1$, and where the reflection from the far end of the line arrives at the desired time thereafter $2\Delta_2$ in opposite polarity to that of the original pulse. Fig. 7 shows the input pulse and Fig. 8 the output wave, both for idealized conditions of a rectangular pulse and a lossless line. In effect, the positive polarity of the Z voltage is a rectangular pulse delayed after the original and shortened. The negative polarity portion is of little concern here, merely blanking out the oscilloscope trace more completely after the desired current pulse has been brightened. Fig. 2 includes the circuit used for the gate, which comprises an artificial line 44. Fig. 10 is a copy of an oscillogram of the Z output of this gate when a voltage of the form shown in Fig. 9 is applied to its input.

An alternate method of obtaining the gating voltage is to utilize the pulse of the trigger generator instead of that of the main pulser. The trigger pulse is set at a width slightly less than the plateau width of the main pulse and is applied to the Z input of the oscilloscope through a delay line.

Although many satisfactory characteristic curves can be obtained without the use of the gate, some cannot be taken without it. The gate offers several other important advantages. It restricts the viewing of the pulse to the short intervals when the grid is at its prescribed voltage. It simplifies the wave-shape requirements of the pulser. Extraneous illumination on the cathode-ray tube is eliminated. It avoids confusion in the displaying and interpretation of the curve especially in those cases in which an increase in grid voltage results in a decrease in plate current.

*Oscilloscope vertical deflection*

Grid, plate and other electrode currents may be measured by the vertical deflection on the oscilloscope screen due to the voltage drop across a small impedance in series with the particular electrode. As shown in each of Figs. 1 and 2, resistors 22 and 26 in parallel with the primaries of transformers 25 and 30 respectively are provided in the plate and grid leads. Transformers 25 and 30 are of the pulse type and measure only the pulse component of electrode current. This, however, represents the entire current under the conditions of test used here, where the tube is cut off between pulses and on only during each pulse. The transformers provide a needed step-up in voltage to the oscilloscope and convenient isolation of the oscilloscope from the power circuits. The secondaries are connected to the oscilloscope through a suitably matched cable. Switch 45 is provided for connecting either plate transformer 25 or grid transformer 30 to oscilloscope 31.

*Oscilloscope horizontal sweep*

A horizontal sweep is required that is proportional to the voltage on the tube electrode in terms of which the characteristic is taken. Supply 46 may be taken from the 60 cycle power line and includes a transformer and a suitable phase adjuster to set the sweep in phase with electrode voltage variation. Exact phasing is indicated by coincidence of the observed characteristics corresponding to increasing and decreasing A. C. electrode voltage. A separate transformer is preferred for the sweep circuit even though its waveform may deviate slightly from that of the transformer used in plate supply 24 and grid supply 29. A separate transformer is more convenient and permits setting the amplitude of the sweep independently of changes made in the plate or grid alternating voltage. In order to insure proportionality between horizontal input signal and deflection, the sweep width is preferably set for about half, or less, of the diameter of the cathode ray tube screen.

*Calibration circuit*

The calibration circuit will be described in connection with the description of the procedure for taking the plate current versus plate voltage characteristic.

*Plate current versus plate voltage curves*

In order to display the curve of plate current as a function of plate voltage, all of the electrodes except the grid and plate are maintained at the desired potentials by suitable sources of constant voltage (not shown). The range of values of plate voltage is first selected. Suppose it is desired to take the characteristic from $Ep=0$ to $Ep=500$ volts. The plate supply may consist of A. C. alone or of A. C. and D. C. in series. In the former case, D. C. source 23 is not used and A. C. source 24 is adjusted to a peak value of 500 volts. The plate voltage swing is therefore from $-500$ volts to $+500$ volts. This arrangement requires a range of plate voltages partially in the negative region and does not utilize the area of the oscilloscope tube efficiently. It is usually preferable to use both A. C. and D. C. on the plate. To take the characteristic from $Ep=0$ to $Ep=500$ volts, D. C. source 23 is adjusted to a value $Vp_0=250$ volts, as illustrated in Fig. 3. A. C. source 24 is adjusted to a peak value of $Vp_0=250$ volts. The plate voltage swing therefore coincides with the desired range of 0–500 volts. By varying the relative proportions of A. C. and D. C., the upper and lower limits of the plate voltage curve may be varied so as to view selected portions of the characteristic on an expanded horizontal voltage scale.

Grid bias supply 28 is set at a value $-Vg_0$ (see Fig. 4) sufficient to cut off tube 21 for all values of plate voltage up to 500 volts. Switch 46 is set to apply the output of pulse generator 27 and supply 28 in series to meter 32. Slide-back peak voltmeter 32 is set to measure the peak grid voltage $Vg$ to be used and the pulse generator 27 is turned on and raised until the peak voltmeter just begins to show a reading. This indicates that the pulse voltage in series with the grid bias reaches a peak value of $Vg$ volts with respect to the cathode of tube 21. The auxiliary pulser (not shown) used to trigger main pulser 27 is adjusted for a repetition rate giving a small duty ratio. The repetition rate should be non-synchronous with 60 cycles so that the complete characteristic curve will be displayed.

Plate pulse transformer 25 is connected by means of switch 45 to the vertical deflection system of oscilloscope 31. The vertical amplification and horizontal sweep are set in order to give usable deflections and the characteristic appears on the screen. Use is made of the phase adjuster of A. C. supply 46 to bring phase coincidence to the characteristics resulting from ascending and descending plate voltage.

To obtain calibration of the plate current indicated on oscilloscope 31, pulser 27 is set at a given peak voltage with vacuum tube voltmeter 32. Switch 36 is set to disconnect tube 21 and to connect one of the resistors of known value, 33 or 35 to pulser 27. A high resistance 47 is connected between grid bias 28 and tube 21 to maintain grid bias during operation of switch 36. The output of transformer 25 is connected to oscilloscope 31. Since all values of resistance in the circuit are known the current can readily be calculated and the oscilloscope calibrated.

Figure 11:
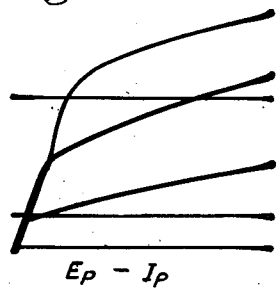

Fig. 11 is a curve representing the plate current versus plate voltage characteristic for a type 6C4 tube at grid voltages of 50, 100 and 150 volts with a plate voltage swing of 0–500 volts. The calibration markers shown are 0.2 and 1.0 ampere.

Grid current versus plate voltage

Figure 12:
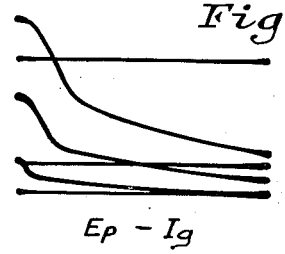

The procedure just outlined for the plate current versus plate voltage characteristic is used throughout except that the oscilloscope vertical input is connected by means of switch 45 to the secondary of grid pulse transformer 30 so as to measure grid current instead of plate current. Fig. 12 shows grid current for the same conditions as used in taking the curve of Fig. 11.

Plate current versus grid voltage

To obtain the plate current versus grid voltage curve, plate D. C. supply 23 is adjusted to the value for which a characteristic is desired. Plate 60 cycle supply 24 is not used. The vertical input of oscilloscope 31 is connected by means of switch 45 to the secondary of plate pulse transformer 25. Suppose it is desired to take the curve for values of grid voltage from $Vg_1 = -45$ volts to $Vg_2 = +155$ volts. Grid 60 cycle supply 29 is adjusted to a peak value of 100 volts (crest to trough voltage of 200). Grid bias supply 28 is set at a value $-Vg_0$ sufficient to cut off tube 21. Pulser 27 is set at a voltage such that the curve will start at the desired value of $Vg_1 = -45$ volts. Fig. 5 is a diagram of the grid voltage during this test. The exact value of either the grid bias voltage or the pulser voltage is not critical. Provided that the bias voltage is sufficient to cut off tube 21 for all values of A. C. supply 29, it is only necessary that the sum of these voltages be adjusted so that the curve starts at $Vg_1$ (and of necessity ends at $Vg_2$). This may conveniently be done by turning off A. C. supply 29 and using peak meter 32 to set the sum of the bias voltage and the pulser voltage to a value equal to the difference between the lower limit of the grid voltage swing $Vg_1$ (−45 volts) and the peak negative value of the grid A. C. supply 28 (−100 volts). In the example supposed, this would be +55 volts.

Figure 13:
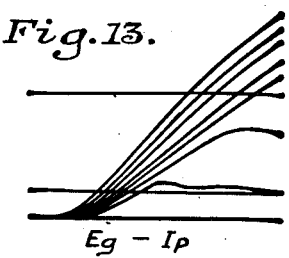

Fig. 13 shows a family of curves of plate current versus grid voltage for a type 6C4 tube for a grid swing from −45 volts to +155 volts at plate potentials of 50, 100, 150, 200, 300, 400 and 500 volts. The calibration lines are at 0.2 and 1.0 ampere.

Grid current versus grid voltage

Figure 14:
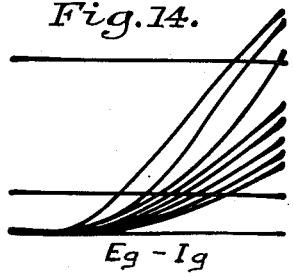

The procedure is identical to that just outlined for plate curent versus grid voltage except that the vertical input of oscilloscope 31 is connected by means of switch 45 to the secondary of grid pulse transformer 30. Fig. 14 shows a family of grid current versus grid voltage curves for the same conditions used in obtaining Fig. 13, with an additional (top) curve for zero plate potential.

Other uses of the curve tracer

Although the invention is particularly useful for obtaining characteristics at high power levels in the positive grid region, it is apparent that characteristics at low power levels in the negative grid region can be obtained without change of procedure or apparatus.

Figure 15:
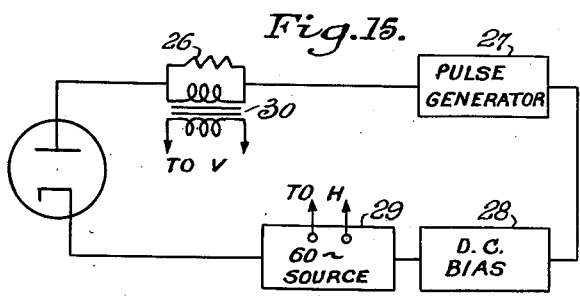
Fig. 15 is a diagram of connections which may be used to obtain the plate current versus plate voltage characteristic curves of a diode.

Characteristics of elements other than input grid and output anode may be taken using the general methods outlined above. For example, the plate current versus plate voltage characteristic of a diode, or a multi-element tube connected as a diode, may be taken. The plate is connected to the usual grid terminal of the test set and the procedure is the same as for a triode grid current versus grid voltage curve except that the usual plate terminal and plate supply of the curve tracer is not used. Fig. 15 is a diagram of the connections used to obtain such a curve.

Tube characteristics show relationships between electrode currents and voltages, as functions which are independent of time. This is almost true for long periods for many tubes operated at low power levels. At high pulsed levels of power, changes in tube current at fixed voltages can occur during microsecond intervals. When these changes are large, the characteristic is no longer valid and a tube showing such rapid changes is limited in its suitability for microsecond pulsed applications. Appreciable change in current during the pulse interval, slump or rise, manifests itself on the oscilloscope by changing the dots to vertical dashes having a height proportional to the change. A characteristic so taken will show a broad instead of a fine line, the thickness of the line vertically indicating the degree of current variation during the pulse interval. The curve tracer thus has value in addition to that of measuring characteristics in indicating and evaluating microsecond slump in emission or other rapid changes in current where they occur.

It will be apparent that the apparatus described can be applied to other devices, having non-linear response to a varying applied voltage as, for instance, crystal rectifiers, transistors or electrical networks.

What is claimed is:

1. Apparatus for automatically displaying on an oscilloscope a curve representing the current of an electrode of an electronic tube as a function of the voltage of the same or another electrode of said tube comprising: means for applying a first voltage, with an alternating component whose crest to trough value is equal to the variation of electrode voltage for which the characteristic is to be taken, to that electrode of said tube whose voltage is to constitute one variable of the curve; means for applying a second, direct voltage, sufficient to render said tube non-conductive for all values of said first voltage, to any electrode of said tube; means for applying voltage pulses, of a magnitude sufficient to render said tube conductive periodically, to the same electrode to which said second voltage is applied; an oscilloscope; means for applying a voltage proportional to said alternating component to one deflection system of said oscilloscope; and means for applying a voltage proportional to the current of any electrode of the tube to the other deflection system of said oscilloscope.

2. Apparatus according to claim 1, further comprising means to brighten the trace of said oscilloscope only for a substantial portion of the duration of each voltage pulse.

3. Apparatus for displaying on an oscilloscope a curve representing the current of an electrode of an electronic tube as a function of the voltage of the same or of another electrode of said electronic tube comprising: means for applying a first voltage with an alternating component to that electrode of said tube whose voltage is to constitute one variable of the curve; means for applying a second, direct voltage, sufficient to render said tube non-conductive for all values of said first voltage, to any electrode of said tube; means for applying voltage pulses, of a magnitude sufficient to render said tube conductive periodically, to the same electrode to which said second voltage is applied; an oscilloscope; means for applying a voltage proportional to said alternating component to one deflection system of said oscilloscope; and means for applying a voltage proportional to the current of any electrode of said tube to the other deflection system of said oscilloscope.

4. Apparatus according to claim 3 further comprising means for brightening the trace of said oscilloscope only for a substantial portion of the duration of each voltage pulse.

5. Apparatus according to claim 3, further comprising means for calibrating said other deflection system of said oscilloscope.

6. Apparatus for displaying on an oscilloscope a curve representing the current of an electrode of an electronic tube as a function of the voltage of the same or of another electrode of said electronic tube comprising: means for applying a first voltage with an alternating component to that electrode whose voltage is to constitute one variable of the curve; means for applying a second, direct voltage, sufficient to render said tube non-conductive for all values of said first voltage, to any electrode of said tube; means for applying voltage pulses, of a magnitude sufficient to render said tube conductive periodically, in series with said second, direct voltage; an oscilloscope; means for applying a voltage proportional to said alternating component to one deflection system of said oscilloscope; and means for applying a voltage proportional to the current of any electrode to the other deflection system of said oscilloscope.

7. Apparatus according to claim 6, further comprising means for brightening the trace of said oscilloscope only for a substantial portion of the duration of each voltage pulse.

8. Apparatus according to claim 6, further comprising means for calibrating said other deflection system of said oscilloscope.

9. Apparatus for displaying on an oscilloscope the characteristic curves of an electronic tube comprising: means for applying to the circuit of one electrode of the tube a potential with an alternating component; means for rendering said tube non-conductive for all values of said potential; means for applying to said tube voltage pulses to render said tube conductive periodically during at least a portion of the cycle of said potential; an oscilloscope; means for applying a voltage proportional to said alternating component to one deflection system of said oscilloscope and means for applying a voltage proportional to the current of any electrode to the other deflection system of said oscilloscope.

10. Apparatus for displaying on an oscilloscope the characteristic curves of an electronic tube comprising: means for applying to the circuit of one electrode of the tube a potential with an alternating component; means for rendering the tube non-conductive for all values of said potential; means for rendering the tube conductive periodically; an oscilloscope; means for applying a voltage proportional to said alternating component to one deflection system of said oscilloscope; and means for applying a voltage proportional to the phenomenon to be displayed to the other deflection system of the oscilloscope.

11. Apparatus for displaying the characteristic curves of an electronic tube on an oscilloscope comprising means to apply an alternating voltage to an electrode of said tube and to one deflection system of said oscilloscope; means to render said tube normally non-conductive; means to apply pulses to said tube to render it conductive periodically; and means to apply a voltage proportional to the current of any electrode to the other deflection system of said oscilloscope.

12. The apparatus of claim 11, further comprising means to brighten the trace of said oscilloscope only for a substantial portion of the duration of each of said pulses.

13. Apparatus for displaying the characteristic curves of an electronic tube comprising means to apply an alternating voltage to one electrode of said tube and to one deflection system of an oscilloscope; means to render said tube conductive periodically; and means to apply a voltage, proportional to the current of any electrode of said tube, to the other deflection system of said oscilloscope.

14. The apparatus of claim 13, further comprising means to brighten the trace of said oscilloscope only for a portion of the duration of each of said pulses.

15. Apparatus according to claim 13, further comprising means to calibrate said other deflection system of said oscilloscope.

16. Apparatus according to claim 13, further comprising means to brighten the trace of said oscilloscope only for a portion of the duration of each pulse; and means for calibrating said other deflection system of said oscilloscope.

17. The method of automatically displaying on an oscilloscope a curve representing the current of an electrode of an electronic tube as a function of the voltage of the same or another electrode of said tube comprising the steps of: applying a first voltage with an alternating component to that electrode of the tube whose voltage is to constitute one variable of the curve; adjusting the crest to trough voltage of said alternating component to a value equal to the variation of electrode voltage for which the characteristic is to be displayed; applying a second, direct voltage, sufficient to render the tube non-conductive for all values of said first voltage, to any electrode of the tube; applying voltage pulses, of a magnitude sufficient to render the tube conductive periodically, to the same electrode to which said second voltage is applied; applying a voltage proportional to said alternating component to one deflection system of the oscilloscope; and applying a voltage proportional to the current of any electrode of the tube to the other deflection system of the oscilloscope.

18. The method of claim 17, further comprising the step of brightening the trace of said oscilloscope only for a substantial portion of the duration of each voltage pulse.

19. The method of displaying on an oscilloscope a curve representing the current of an electrode of an electronic tube as a function of the voltage of the same or another electrode of said electronic tube comprising the steps of: applying a first voltage with an alternating component to that electrode of the tube whose voltage is to constitute one variable of the curve; applying a second, direct voltage sufficient to render said tube non-conductive for all values of said first voltage, to any electrode of said tube; applying voltage pulses, of a magnitude sufficient to render said tube conductive periodically, to the same electrode to which said second voltage is applied; applying a voltage proportional to the alternating component of said first voltage to one deflection system of the oscilloscope; and applying a voltage proportional to the current of any electrode of said tube to the other deflection system of said oscilloscope.

20. The method of claim 19 comprising the further step of brightening the trace of the oscilloscope only for a substantial portion of the duration of each voltage pulse.

21. The method of displaying on an oscilloscope a curve representing the current of an electrode of an electronic tube as a function of the voltage of the same or another electrode of said electronic tube comprising the steps of: applying a first voltage with an alternating component to that electrode whose voltage is to constitute one variable of the curve; applying a second, direct voltage, sufficient to render the tube non-conductive for all values of said first voltage, to any electrode of the tube; applying voltage pulses, of a magnitude sufficient to render the tube conductive periodically, in series with said second direct voltage; applying a voltage proportional to said alternating component to one deflection system of the oscilloscope; and applying a voltage proportional to the current of any electrode to the other deflection system of the oscilloscope.

22. The method of claim 21, further comprising the step of brightening the trace of said oscilloscope only for a substantial portion of the duration of each voltage pulse.

23. Apparatus for displaying on an oscilloscope the curve of plate current as a function of plate voltage of an electronic tube connected as a diode comprising: a source of alternating voltage, a source of direct voltage, and a pulse generator connected in series between the electrodes of said tube; means for applying said alternating voltage to one deflection system of said oscilloscope; and means for applying a voltage proportional to the current through said tube to the other deflection system of said oscilloscope.

24. The apparatus of claim 23 further comprising means for brightening the trace of said oscilloscope only for a portion of the duration of each pulse produced by the pulse generator.

25. The method of displaying on an oscilloscope a curve representing the plate current of a diode as a function of plate voltage which comprises the steps of: applying to the diode and to one deflection system of the oscilloscope an alternating voltage; applying a direct voltage, in series with said alternating voltage, to said diode; adjusting the direct voltage so as to cut off said diode for all values of said alternating voltage; applying pulses so as to render said diode conductive periodically; and applying a voltage, proportional to the current through said diode, to the other deflection system of said oscilloscope.

26. The method of claim 25, comprising the further step of brightening the trace of said oscilloscope for a portion of the duration of each pulse.

27. Apparatus for displaying on an oscilloscope a curve representing the plate current of an electronic tube as a function of plate voltage comprising: means to apply to the plate circuit of said tube an alternating voltage; means to apply to the grid circuit of said tube a direct voltage sufficient to bias said tube to cut-off; means to apply to said grid circuit, voltage pulses to render said tube conductive periodically; an oscilloscope; means to apply a voltage proportional to said alternating voltage to one deflection system of said oscilloscope; and means to apply a voltage proportional to plate current to the other deflection system of said oscilloscope.

28. Apparatus according to claim 27, further comprising means to brighten the trace of said oscilloscope only for a substantial portion of the duration of each of said pulses.

29. Apparatus for displaying on an oscilloscope a curve representing the plate current of an electronic tube as a function of plate voltage comprising: means to apply to the plate circuit of said tube an alternating voltage and a direct voltage in series; means to apply to the grid circuit of said tube a direct voltage sufficient to render said tube non-conductive for all values of voltage applied to said plate circuit; means to apply, to said grid circuit, voltage pulses to render said tube conductive periodically; an oscilloscope; means to apply a voltage proportional to said alternating voltage to one deflection system of said oscilloscope; and means to apply a voltage proportional to plate current to the other deflection system of said oscilloscope.

30. Apparatus according to claim 29, further comprising means to brighten the trace of said oscilloscope during the application of said pulses.

31. Apparatus for displaying on an oscilloscope a curve representing the grid current of an electronic tube as a function of plate voltage comprising: means to apply to the plate circuit of said tube an alternating voltage; means to apply to the grid circuit of said tube a direct voltage sufficient to bias said tube to cut-off; means to apply to said grid circuit voltage pulses to render said tube conductive periodically; an oscilloscope; means to apply a voltage proportional to said alternating voltage to one deflection system of said oscilloscope; and means to apply a voltage proportional to grid current to the other deflection system of said oscilloscope.

32. Apparatus according to claim 31, further comprising means to brighten the trace of said oscilloscope only for a substantial portion of the duration of each of said pulses.

33. Apparatus for displaying on an oscilloscope a curve representing the grid current of an electronic tube as a function of plate voltage comprising: means to apply to the plate circuit of said tube an alternating voltage and a direct voltage in series; means to apply to the grid circuit of said tube a direct voltage sufficient to bias said tube to cut-off; means to apply to said grid circuit voltage pulses to render said tube conductive periodically; an oscilloscope; means to apply a voltage proportional to said alternating voltage to one deflection system of said oscilloscope; and means to apply a voltage proportional to grid current to the other deflection system of said oscilloscope.

34. Apparatus according to claim 33 further comprising means to brighten the trace of said oscilloscope only for a substantial portion of the duration of each of said pulses.

35. Apparatus for displaying on an oscilloscope a curve representing the plate current as a function of grid voltage of an electronic tube comprising: means to apply a direct voltage to the plate circuit of said tube; means to apply to the grid circuit of said tube an alternating voltage; means to apply to the grid circuit a direct voltage sufficient to bias said tube to cut-off; means to apply, to said grid circuit, voltage pulses to render said tube conductive periodically; an oscilloscope; means to apply a voltage proportional to said alternating voltage to one deflection system of said oscilloscope; and means to apply a voltage proportional to plate current to the other deflection system of said oscilloscope.

36. Apparatus according to claim 35, further comprising means to brighten the trace of said oscilloscope only for a substantial portion of the duration of each of said pulses.

37. Apparatus for displaying on an oscilloscope a curve representing grid current as a function of grid voltage of an electronic tube comprising: means to apply a direct voltage to the plate circuit of said tube; means to apply to the grid circuit of said tube an alternating voltage; means to apply to the grid circuit a direct voltage sufficient to bias said tube to cut-off; means to apply to said grid circuit voltage pulses to render said tube conductive periodically; an oscilloscope; means to apply a voltage proportional to said alternating voltage to one deflection system of said oscilloscope; and means to apply a voltage proportional to grid current to the other deflection system of said oscilloscope.

38. Apparatus according to claim 37, further comprising means to brighten the trace of said oscilloscope only for a substantial portion of the duration of each of said pulses.

39. Apparatus for displaying on the oscilloscope a curve of current as a function of applied voltage of a non-linear conducting device comprising: a source of alternating voltage, a source of direct voltage, and a pulse generator connected in series across said device; means for applying said alternating voltage to one deflection system of said oscilloscope; and means for applying a voltage proportional to the current through said device to the other deflection system of said oscilloscope.

40. The apparatus of claim 39 further comprising means for brightening the trace of said oscilloscope only for a portion of the duration of each pulse produced by the pulse generator.

41. The method of displaying on an oscilloscope a curve representing the current through a non-linear conducting device as a function of applied voltage which comprises the steps of: applying to said device and to one deflection system of the oscilloscope an alternating voltage; applying a direct voltage, in series with said alternating voltage, to said device; adjusting the direct voltage so as to cut-off said device for all values of said alternating voltage; applying pulses so as to render said device conductive periodically; and applying a voltage, proportional to the current through said device to the other deflection system of said oscilloscope.

42. The method of claim 40, comprising a further step of brightening the trace of said oscilloscope for only a portion of duration of each pulse.

HERBERT M. WAGNER.

REFERENCES CITED

The following references are of record in the file of this patent:

UNITED STATES PATENTS

| Number | Name | Date |
|---|---|---|
| 2,411,963 | George | Dec. 3, 1946 |
| 2,443,794 | Mac Nichol, Jr. | June 22, 1948 |
| 2,453,711 | Isbister et al. | Nov. 16, 1948 |
| 2,460,471 | Schade | Feb. 1, 1949 |
| 2,478,742 | Buonincontri | Aug. 9, 1949 |
| 2,485,924 | Sanders | Oct. 25, 1949 |
| 2,494,369 | Sinstein | Jan. 10, 1950 |
| 2,523,487 | Wilchinsky | Sept. 26, 1950 |
| 2,533,670 | Hart | Dec. 12, 1950 |
| 2,534,957 | Delvaux | Dec. 19, 1950 |